United States Patent
Byers et al.

(10) Patent No.: US 9,703,650 B1
(45) Date of Patent: Jul. 11, 2017

(54) POWER SHARING FOR NETWORK DEVICES

(71) Applicant: Cisco Technology, Inc., San Jose, CA (US)

(72) Inventors: Charles Calvin Byers, Wheaton, IL (US); Gonzalo Salgueiro, Raleigh, NC (US); Joseph M. Clarke, Raleigh, NC (US)

(73) Assignee: Cisco Technology, Inc., San Jose, CA (US)

( * ) Notice: Subject to any disclaimer, the term of this patent is extended or adjusted under 35 U.S.C. 154(b) by 13 days.

(21) Appl. No.: 14/991,954

(22) Filed: Jan. 10, 2016

(51) Int. Cl.
  *G06F 11/00* (2006.01)
  *G06F 11/20* (2006.01)
  *G06F 1/30* (2006.01)

(52) U.S. Cl.
  CPC ............ *G06F 11/2015* (2013.01); *G06F 1/30* (2013.01); *G06F 2201/805* (2013.01)

(58) Field of Classification Search
  USPC .......................................................... 714/14
  See application file for complete search history.

(56) References Cited

U.S. PATENT DOCUMENTS

| | | | |
|---|---|---|---|
| 7,165,192 B1 * | 1/2007 | Cadieux | H04L 41/0631 714/43 |
| 7,835,295 B2 | 11/2010 | Brewer et al. | |
| 8,375,232 B2 | 2/2013 | Khan et al. | |
| 8,438,308 B2 * | 5/2013 | Gan | G06F 11/1464 370/242 |
| 8,502,408 B2 | 8/2013 | Schneider et al. | |
| 8,725,905 B2 | 5/2014 | Terry et al. | |
| 9,110,972 B2 | 8/2015 | Hamdi et al. | |
| 9,176,555 B2 | 11/2015 | Choo et al. | |
| 2004/0181709 A1 * | 9/2004 | Gibson | H04L 1/22 714/25 |
| 2006/0089230 A1 | 4/2006 | Biederman et al. | |

(Continued)

FOREIGN PATENT DOCUMENTS

| | | |
|---|---|---|
| WO | 2014/129966 | 8/2014 |
| WO | 2015/144457 | 10/2015 |

OTHER PUBLICATIONS

Allied Telesyn; "How to Power Over Ethernet"; available on the the world wide web at: www.alliedtelesyn.com, 12 pages, 2005.

(Continued)

*Primary Examiner* — Sarai Butler
(74) *Attorney, Agent, or Firm* — Samuel M. Katz

(57) ABSTRACT

In one embodiment, a data processing device includes power port units for connection to network devices. Each power port unit is selectively configurable to operate as either (i) a Power Source Equipment port unit to provide power to a network device, or (ii) a Powered Device (PD) port unit to sink power from a network device. The device also includes a processor. In response to a power supply failure, the processor is operative to poll at least two network devices to determine if they are able to supply power, receive a response from each of the at least two network devices, and configure at least two power port units as PD port units to sink power from the at least two network devices. At least part of the received power is transferred from the at least two power port units via a power summing node to at least one local load.

20 Claims, 8 Drawing Sheets

(56) References Cited

U.S. PATENT DOCUMENTS

| | | |
|---|---|---|
| 2006/0273661 A1 | 12/2006 | Toebes et al. |
| 2013/0301745 A1 | 11/2013 | Maniktala |
| 2014/0115354 A1 | 4/2014 | Jabbaz et al. |
| 2015/0256748 A1 | 9/2015 | Herzel |

OTHER PUBLICATIONS

CIE-Group; CYP III, CYP-PU-607BD-RX: HDMI over Single CAT5e/6/7 HDBaseT-Bi-directional PoE Receiver; available on the worldwide web at: http://www.cie-group.com/shop/av-distribution_19/hdbaset_1025/hdbaset-transmitters-recievers_1028/hdmiover-single-cat5e/6/7-hdbaset-bi-directional-poe-receiver_11101.php; 2 pages. Aug. 26, 2014.
Electrical-knowhow; "Specific Electrical Design Requirements for Commercial Buildings—Part One"; available on the worldwide web at:http://www.electrical-knowhow.com/2012/02/specific-electrical-design-requirements.html.
Mendelson, Galit; "All You Need to Know About Power Over Ethernet (pOe) and the IEEE 802.3af Standard". May 2, 2004.
Palizbana, Omid et al; "Microgrids in Active Network Management—Part I and Part II"; in Renewable and Sustainable Energy Reviews; vol. 36, Jan. 2014, pp. 440-451.
Stojmenovic, Ivan; "Fog Computing: A Cloud to the Ground Support for Smart Things and Machine-to-Machine Networks"; in in Telecommunication Networks and Applications Conference (ATNAC), 2014 Australian, vol., No., pp. 117-122, Nov. 26-28, 2014.
Taft, J.D.; Pacific Northwest National Laboratory; "The Emerging Interdependence of the Electric Power Grid & Information and Communication Technology"; PNNL-24643; Aug. 2015.
Office Action for U.S. Appl. No. 14/469,006, dated May 9, 2016.

\* cited by examiner

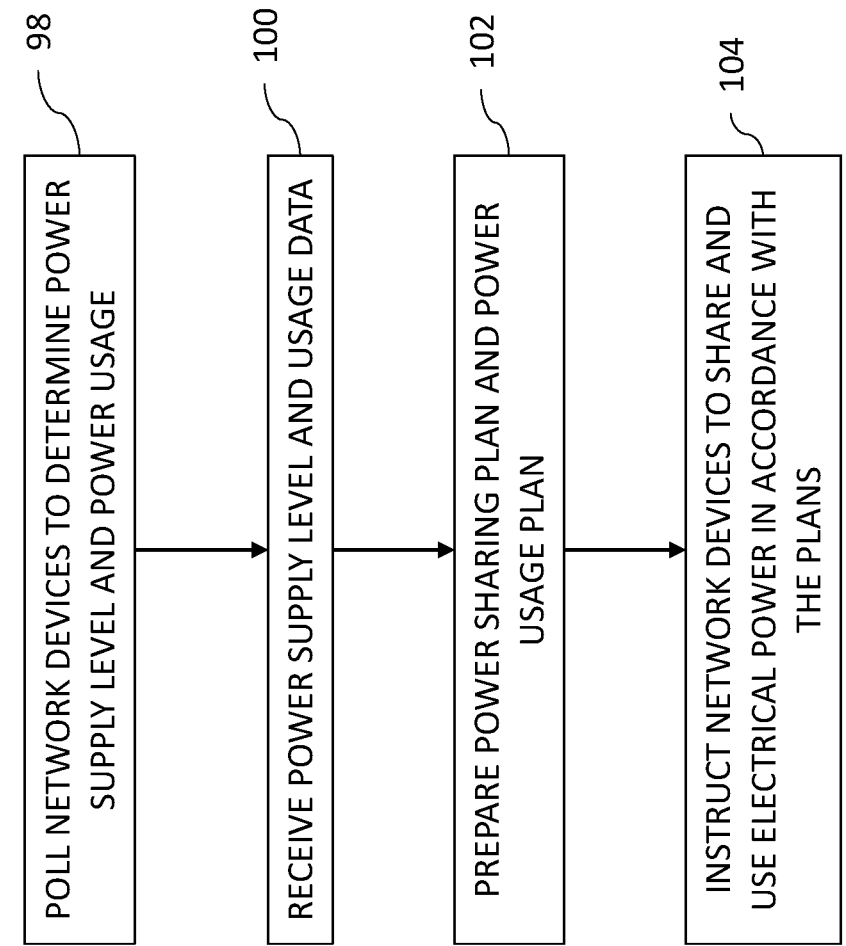

POWER SHARING FOR NETWORK DEVICES

TECHNICAL FIELD

The present disclosure generally relates to power sharing for network devices.

BACKGROUND

Fog computing is a system level architecture that extends the compute networking and storage capabilities of cloud to the edge of Internet of things (IoT) networks. Fog Computing is a highly virtualized platform that provides compute, storage, and networking services between end devices and traditional Cloud Computing Data Centers, typically but not exclusively, located at the edge of network. A Fog node is a physical network device that implements the Fog network. A Fog node may be connected by a network facility to an IoT device and/or a gateway to the cloud. Many IoT networks run mission critical and even life critical applications. Power in particular is a key failure mode in many IoT networks, and if efficient reliable power options are not available for them, the application space of Fog computing and IoE may be severely limited.

BRIEF DESCRIPTION OF THE DRAWINGS

The present disclosure will be understood and appreciated more fully from the following detailed description, taken in conjunction with the drawings in which:

FIG. 8 is a flow chart showing exemplary steps performed by a device during a non-localized power failure.

DESCRIPTION OF EXAMPLE EMBODIMENTS

Overview

Figure 1:
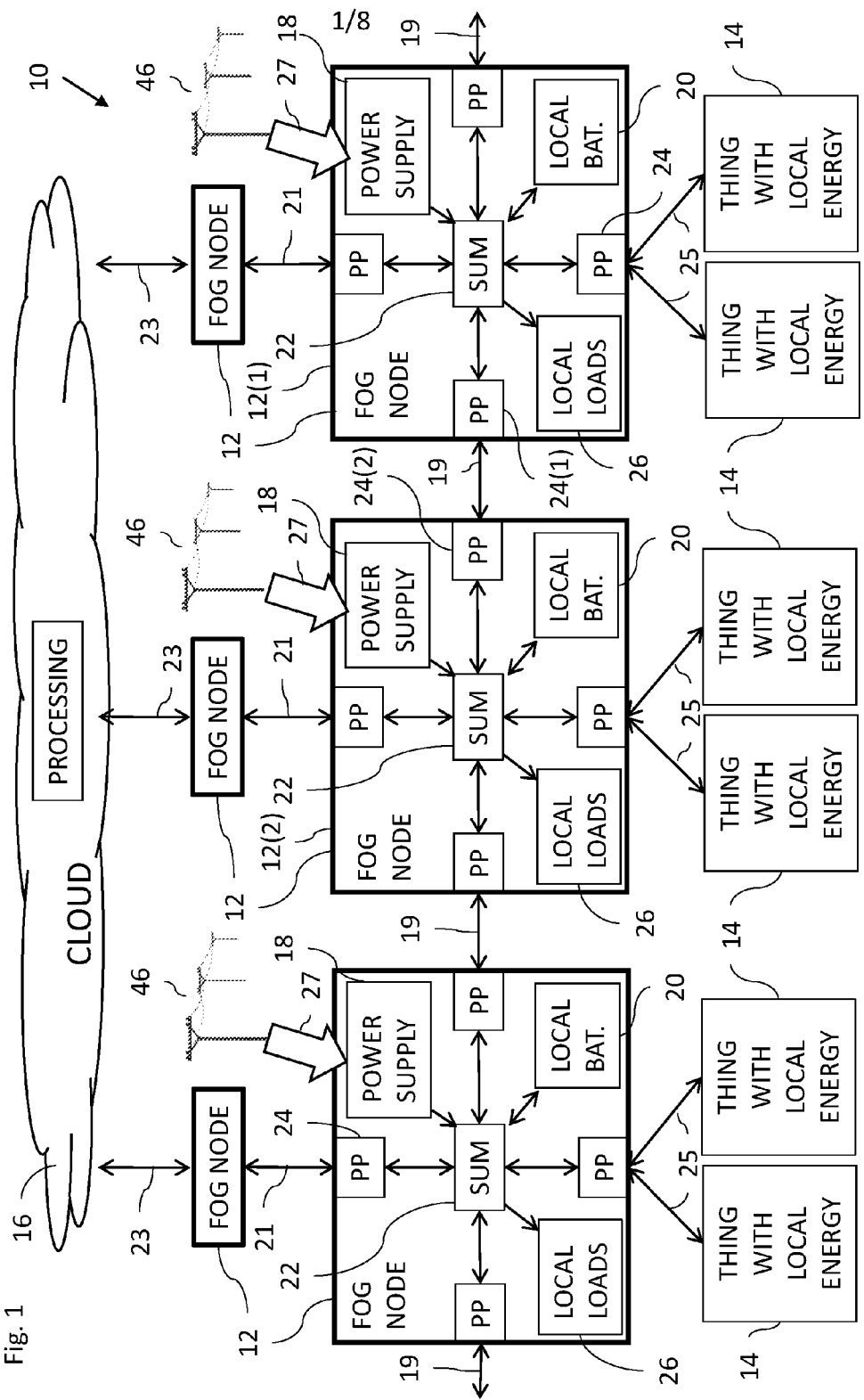
FIG. 1 is a partly pictorial, partly block diagram view of a network device power sharing system constructed and operative in accordance with an embodiment of the present disclosure.

There is provided in accordance with an embodiment of the present disclosure, a data processing device including a plurality of power port units for connection to a plurality of network devices, each one power port unit of the plurality of power port units being selectively configurable to operate as either (i) a Power Source Equipment (PSE) port unit to provide electrical power to one network device of the plurality of network devices, or (ii) a Powered Device (PD) port unit to sink electrical power from the one network device. The data processing device including a plurality of data port units to exchange data with the plurality of network devices, a processor to process at least some of the data, a power supply, a plurality of local loads, and a power summing node to electrically connect the power supply, the plurality of power port units and the plurality of local loads. In response to a failure of the power supply, the processor is operative to poll at least two network devices of the plurality of network devices to determine if the at least two network devices are able to supply electrical power, receive a response from each of the at least two network devices, configure at least two power port units of the plurality of power port units as PD port units to sink electrical power from the at least two network devices. At least part of the received electrical power is transferred from the at least two power port units via the power summing node to one or more local loads of the plurality of local loads.

There is also provided in accordance with another embodiment of the present disclosure, a method including exchanging data with a plurality of network devices, processing at least some of the data, in response to a failure of a power supply, polling at least two network devices of the plurality of network devices to determine if the at least two network devices are able to supply electrical power, receiving a response from each of the at least two network devices, configuring at least two power port units as Powered Device (PD) port units to sink electrical power from the at least two network devices, each of the at least two power port units being selectively configurable to operate as either (i) a Power Source Equipment (PSE) port unit to provide electrical power to a network device, or (ii) a PD port unit to sink electrical power from a network device, receiving electrical power from the at least two network devices, and transferring at least part of the received electrical power via a power summing node to at least one local load.

There is also provided in accordance with still another embodiment of the present disclosure, a system including a device including a processor to in response to a power supply failure in at least some network devices of a plurality of network devices, poll the at least some network devices to determine a power supply level and power usage for at least one class of service for each of the at least some network devices, the plurality of network devices being connected to each other to share data and electrical power, receive power supply level and usage data for each of the at least some network devices, based on the received power supply level and usage data, prepare an electrical power sharing plan to share electrical power among the at least some network devices and an electrical power usage plan for the at least some network devices, and instruct the at least some network devices to share electrical power in accordance with the electrical power sharing plan and which services to operate in accordance with the electrical power usage plan.

DETAILED DESCRIPTION

Reference is now made to FIG. 1, which is a partly pictorial, partly block diagram view of a network device power sharing system 10 constructed and operative in accordance with an embodiment of the present disclosure. The network device power sharing system 10 includes a plurality of network devices 12, for example, but not limited to, Fog nodes networked together. Each network device 12, for example, A Fog node, may be connected to one or more network devices 12 and optionally one or more Internet of Things devices 14, for example, but not limited to, a sensor(s) and/or an actuator(s). The network devices 12 may be arranged in layers as shown in FIG. 1 extending from a cloud computing environment 16 to the devices 14. The network device power sharing system 10 allows the network devices 12 to receive power from many sources beyond the one or sometimes two alternating current (AC) or direct current (DC) power sources typical for Internet of Everything (IoE) nodes like routers or gateways. One network device 12 may have many data network connections, including east-west (E-W) links 19 to adjacent peer level network devices 12 in the same layer, and north-south (N-S) links 21 to connect network devices 12 in higher or lower levels (layers) in the network device hierarchy, direct Internet backbone connections 23 to the cloud computing environment 16 (cloud layer), and direct wired connections 25 to the IoT devices 14 (things) associated with the network device 12. The network device power sharing system 10 allows electrical power to flow bi-directionally alongside data on all of the above paths, producing a highly resilient power system.

As shown in FIG. 1 each network device 12 typically includes a utility grid 46 operated power supply 18 as its primary energy source for supplying power to local loads 26, for example, but not limited to, computers, storage and networking elements within the network device 12. The connection from the utility grid 46 to the power supply 18 is shown by an arrow 27. Each network device 12 may have a local battery 20 (disposed internally or externally) to operate the network device 12 for a limited time period if the power supply 18 fails. Each network device 12 includes a plurality of power port units 24 (only two labeled in FIG. 1 for the sake of simplicity). Each power port unit 24 is operative to connect the network device 12 to another network device 12 for data and power sharing. Each network device 12 includes a summing node 22 electrically connecting, and sharing electrical power between, the power supply 18, the local battery 20, the power port units 24 and the local loads 26 of that network device 12.

Power and data sharing among the network devices 12 may be implemented using any suitable power and data sharing technology, for example, but not limited to, Power over Ethernet (PoE) technology allowing bidirectional transfer of both power and data over a single set of CAT5/7 inter-network device cables, or Universal Serial Bus cables (USB), or unidirectional transfer over two separate CAT5/7 inter-network device cables, or power transfer over a suitable conductor with data transfer over a suitable data transfer conduit, for example, but not limited to, a fiber based cable. Each power port unit 24 is typically selectively configurable as Power Sourcing Equipment (PSE) and a Powered Device (PD). So for example, a network device 12(1) may be connected to a network device 12(2). The network device 12(1) may have a power port unit 24(1) configured as a PSE connecting to the network device 12(2) and the network device 12(2) may include a power port unit 24(2) configured as a PD to sink power from the network device 12(1). The power port units 24 are regulated, to provide a stable flow of power in the correct direction and to prevent power overloads from occurring, described in more detail with reference to FIG. 2. The devices 14 hardwired to a specific network device 12 may also have local energy sources (for example an internal battery on a smart camera or a solar panel on a streetlight fixture), and bidirectional power transfer between the network device 12 and the devices 14 directly connected to that network device 12 creates another power flow possibility. Under normal conditions, power flows from the network device 12 to the attached devices 14, but if necessary to operate the network device 12 during a power failure, for example, the flow may be reversed, and some or all of the network device's 12 operational energy may be retrieved from the devices 14 connected to the network device 12. Additionally power may be retrieved from other network devices 12.

Figure 2:
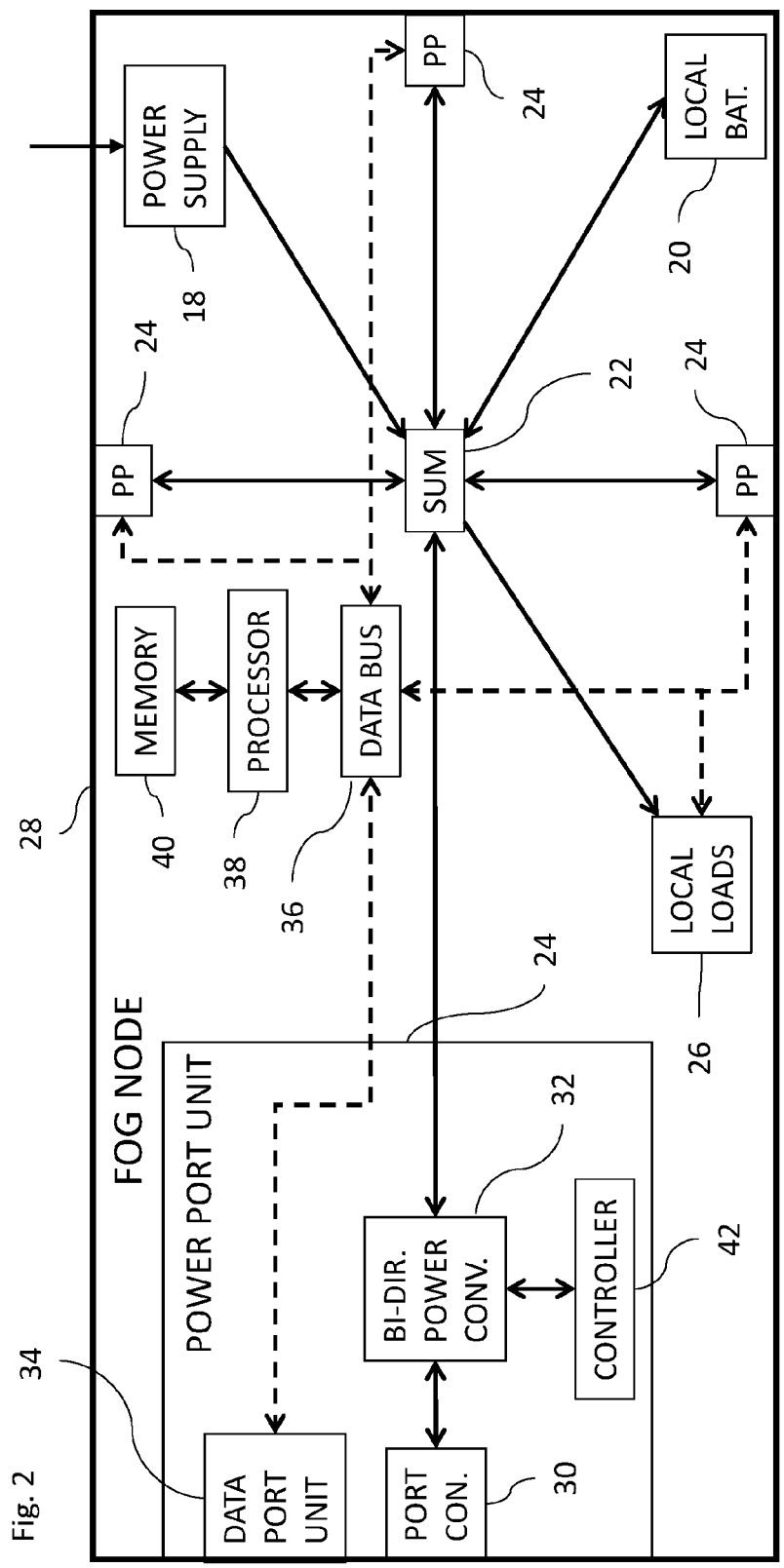
FIG. 2 is a block diagram view of a network device for use in the system of FIG. 1.

Reference is now made to FIG. 2, which is a block diagram view of a network device 28 for use in the system 10 of FIG. 1. The network device 28 and the network devices 12 (FIG. 1) with which the network device 28 shares data and power are primarily data processing devices to provide compute offload services to aggregate, process and transfer data and secondarily share power with other devices as necessary. The elements included in the network device 28 may be included in any of the network devices 12. The network device 28 includes a processor 38 to process data including at least some of the data received from the connected network devices 12, 14. The network device 28 includes a memory 40 to store data used by the processor 38. The network device 28 includes a plurality of power port units 24 for connection to a plurality of network devices 12, 14 (FIG. 1). Each power port unit 24 is selectively configurable to operate as either (i) a Power Source Equipment (PSE) port unit to provide electrical power to a network device 12, 14, or (ii) a Powered Device (PD) port unit to sink electrical power from a network device 12, 14. Each power port unit 24 includes a port connector 30 to mate with a power cable (not shown) connecting the port connector with a network device 12, 14. Each power port unit 24 also includes a bi-directional power convertor 32 to selectively convert electrical power in either a first direction and to provide converted electrical power to the port connector 30 when the power port unit 24 is configured to operate as a PSE port unit, or in a second direction to convert electrical power received from the port connector 30 when the power port unit 24 is configured to operate as the PD port unit. Each power port unit 24 may additionally include a power port unit controller 42 to control the selectively configurable operation of the power port unit 24 as either a PSE port unit or a PD port unit using control signals described in more detail below. The controller 42 also monitors the power port units 24 for overloads, abnormal voltages, and other potentially unsafe conditions, and disconnects the power flow when necessary. The bi-directional power convertor 32 may include a two quadrant power supply having a plurality of switching regulator transistors to receive duty cycle and phase signals from the controller 42 to configure the bi-direction power convertor 32 to selectively convert electrical power in either the first direction or the second direction.

The network device 28 also includes a data bus 36 and a plurality of data port units 34 (only one shown for the sake of simplicity) to exchange data with the network devices 12, 14. Each data port unit 34 may be disposed in one of the power port units 24 or as a separate element. Each data port unit 34 includes a port unit for mating with a data cable connecting the network device 28 to one of the network devices 12, 14. Each data port unit 34 is connected to the data bus 36 for distributing data among the different elements of the network device 28. The data bus 36 is controlled by the processor 38. The data port units 34 and the port connectors 30 are shown as separate elements in FIG. 2. It will be appreciated that the data port unit 34 may be incorporated into the port connector 30 for connection to a single combined data-power cable in which the port connector 30 directs the data component from the cable to the data bus 36 and the power component from the cable to the bi-directional power convertor 32. The network device 28 also includes the power supply 18, the local loads 26, the local battery 20 and the summing node 22. The power supply 18 may include a step down transformer or a switch mode power supply and AC to DC convertor to convert AC received from a utility grid or other AC power source yielding DC electricity for feeding to the summing node 22. The summing node 22 electrically connects the power supply 18, the power port units 24, the local loads 26, the local battery 20 as well as other elements for example, but not limited to, the processor 38 and the memory 40. The network device 28 may include DC to DC convertors between the summing node 22 and the various elements of the network device 28 to step-down or step-up voltage as necessary for the various elements of the network device 28. The local battery 20 may include a rechargeable battery operative to: receive electrical power from the power supply 18 via the power summing node 22; and to supply electrical power to the local loads 26 or to one or more network devices 12, 14 devices via the power summing node 22 and one or more power port units 24. The data and power may be transferred between devices 12, 14 using an Ethernet cable using power over Ethernet (PoE) technology or a universal serial bus (USB) cable using USB technology, for example, but not limited to USB series 3 technology, or using two cables, one for power and one for data, for example, but not limited to, using a power cable and an optical fiber cable.

In accordance with an alternative embodiment the bi-directional power convertor 32 could be replaced by two parallel unidirectional power convertors (not shown), one configurable as a PSE and one configurable as a PD. In accordance with the alternative embodiment, two network devices 12, 14 are connected by at last two cables (not shown), one for power in one direction and one for power in the opposite direction. Data may be carried in one of the cables or both cables or in separate data carrying cables. By way of example, two network devices, the network device 12(1) (FIG. 1) and the network device 12(2) (FIG. 1) may be connected by two Ethernet cables using two ports on each device, port 1 and port 2 (not shown). Port 1 of the network device 12(1) may be configurable as a PSE and port 2 of the network device 12(1) may be configurable as a PD. Port 1 of the network device 12(2) may be configurable as a PSE and port 2 of the network device 12(2) may be configurable as a PD. One of the Ethernet cables is connected from port 1 of the network device 12(1) to port 2 of the network device 12(2). The second Ethernet cable connects port 2 on network device 12(1) to port 1 of the network device 12(2). If a decision is made to send power from the network device 12(1) to the network device 12(2), port 1 of the network device 12(1) is configured as a PSE and is programmed to send the required level of power down the connected cable. Port 2 of the network device 12(2) is configured to receive the power from the network device 12(1). The other two ports have their power transfer capabilities disabled although they could still send data. Now, if the power flow is reversed, the two active ports are disabled, and the other two ports are activated to transfer power. Namely, port 1 of the network device 12(2) is activated as a PSE and port 2 of the network device 12(1) is activate as a PD. In accordance with this alternative embodiment, each of the power port units 24 includes: two port connectors (one for each cable), a first port connector and a second port connector (not shown), each to mate with a cable connecting that port connector with a network device 12, 14; two power convertors, a first power convertor and a second power convertor, the first power convertor to convert electrical power in a first direction and to provide converted electrical power to the first port connector when the power port unit 24 is configured to operate as a PSE port unit, and the second power convertor to convert electrical power in a second direction, converting electrical power received from the second port connectors when the power port unit is configured to operate as a PD port unit. The first power convertor and the second power convertor may be implemented using components used in unidirectional PoE, such as using a PoE line interface and PoE physical layer designs for PoE implementations or USB interfaces for USB implementations, by way of example only.

As described above each power port unit 24 is selectively configurable responsive to a selection signal received from the power port unit controller 42 or the processor 38 to operate as either (i) a PSE port unit to provide/source power to a connected network device 12, 14 or (ii) a PD port unit to sink/receive power from the connected network device 12, 14. Each power port unit 24 performs (i) PSE operations including, but not limited to, PD detection, optional classification, start-up, operation, and disconnect when the power port unit 24 is configured to operate as a PSE port unit, or (i) PD operations when the power port unit 24 is configured to operate as a PD port unit. PD operations include, for example, but are not limited to, presenting to the PSE valid detection and classification signatures responsive to the PSE operations (e.g., detection, classification, and so on). The aforementioned PSE/PD operations may be performed in accordance with the IEEE 802.3 specification/standard or USB standards or any other suitable standard as applicable. At any given time, one or more of the power port units 24 in the network device 28 may be selectively configured responsive to corresponding selection signals as PSE port units to draw power from the summing node 22 and source power to corresponding connected network devices 12, 14 (i.e., the direction of power flow is in the downstream direction), while one or more other ones of the power port unit 24 may be selectively configured responsive to corresponding selection signals as PD port units to sink power from corresponding connected network devices 12, 14 and source power to the summing node 22 (i.e., the direction of power flow is in the upstream direction). The net energy in and out of the summing node 22 is carefully balanced and instantaneously adjusted via a control system described in more detail below. The summing node 22 may be a power summing bus. The selection signals may be discrete analog or digital signals having an analog voltage level or a logic level to select PSE versus PD operation, or may be control commands transmitted over a digital control bus (e.g., a Peripheral Component Interconnect (PCI) bus or Inter-Integrated Circuit (I2C) bus) coupled to the power port unit controller 42 and the bi-directional power convertor 32 of each power port unit 24 to select PSE versus PD operation, for example. The power port unit controller 42 dynamically switches between PSE and PD roles responsive to role selection changes indicated by the selection signals. The speed of response of each power port unit 24 to role selection changes typically depends on the implementation details of each power port unit 24.

The network device 28 may include a local Communication Center, implemented in the processor 38 or in a separate element, to monitor local power-related parameters (based on monitored currents and voltages), including a power consumption, a power need, battery charge state, current flows into and out of the summing node 22, and a measure of any excess power of the network device 28. If the local Communication Center is not implemented in the processor 38, the local Communication Center is operative to convey the monitored parameters as power-related information/data to the processor 38. The monitored parameters may be used by the processor 38 to determine whether the network device 28 has excess power available for transfer to another network device 12, 14. The local Communication Center may also be operative to control the direction of the bidirectional power convertors 32 of the power port unit 24 and a bidirectional power convertor (not shown) of the local battery 20.

A handshake protocol may be implemented between opposite ends of a link between the network device 28 and a connected network device 12, 14 to reverse a power flow direction on the link. The handshake protocol may be implemented in accordance with any suitable protocol, for example, but not limited to, Link Layer Data Protocol (LLDP) and Cisco Discovery Protocol (CDP). Alternatively, the handshake protocol may be implemented as a physical layer protocol, i.e., at the physical layer. An example of a handshake protocol is now described. Assuming one of the power port units 24 was configured as a PD sinking power from another network device 12, 14 acting as a source of power, if the processor 38 now determines that there is an excess of local power in the network device 28, the processor 38 may determine that a reversal in the initial power flow direction over the link between the network device 28 and the network device 12, 14 is necessary. The power port unit controller 42 creates a message to be sent from the port connector 30 of the power port unit 24 to the connected network device 12, 14. The message requests approval (from the power port unit of the connected network device 12, 14) of a role change of the power port unit of the connected network device 12, 14 from PSE to PD. A "Role Change Timer" is started. This timer is set such that if no response is received from the power port unit of the connected network device 12, 14 before the timer expires, then a retry or abort can be issued. The power port unit of the connected network device 12, 14 may approve the role change before the "Role Change Timer" expires. In response to an approval, the power port unit of the connected network device 12, 14 abandons source behavior and switches to sink behavior, i.e., starts operating as a sink power port unit. Also, the power port unit of the connected network device 12, 14 starts a "New Source Wait Timer" and waits to receive an appropriate source voltage from the power port unit 24 of the network device 28 indicating that power port unit 24 has switched from sink to source before the time expires. If the timer expires before the appropriate source voltage is received, a retry can be asserted or a message may be sent to the power port unit 24 to solicit status. If the appropriate source voltage and current is received before the timer expires, then new telemetry messages can be sent over the link to signal a successful completion of role reversal. It should be noted that the appropriate voltage and current requirements also form part of the handshake negotiation with both devices agreeing on the voltage and current to be transferred to the receiving network device 14. An analogous procedure may be used to perform an opposite role reversal if power port unit 24 of the network device 28 initially operates as a power source and the power port unit of the of the connected network device 12, 14 operates as a power sink.

Techniques are also provided to prevent circuit damage in scenarios in which both ends of a link are source at the same time or sink at the same time. During certain error conditions, race conditions, or in case certain control messages are lost in a network, there is a chance that power port units at both ends of a link may be configured to drive power towards each other. In one case, both power port units may operate as sources. In this case, if one power port unit operates as a source, that power port unit will fail power detection with respect to the opposite source and, therefore, will not draw current. The port may receive a detection voltage (for example, less than 10V), which is below a damage threshold. In another case, both power port units may operate as sinks. In this case, both power port units may not receive a source voltage and hence will not be able to draw power. Also, in most role reversal cases (i.e., power flow direction reversals), both power port units may have backup power to sustain their respective operations for a time during which they can send a failure recovery message to each other to recover from the error state since the data channels on the link are not affected by these power direction reversal activities.

As part of periodic telemetry, periodic messages (for example, but not limited to, one per second) may be transmitted from each power port unit 24 to the connected network device 12, 14. If the current sourced from the PSE end of a link does not closely match the current entering the PD end of the link, this mismatch could indicate a cable fault or other abnormal condition, and an alarm could be raised.

Figure 3:
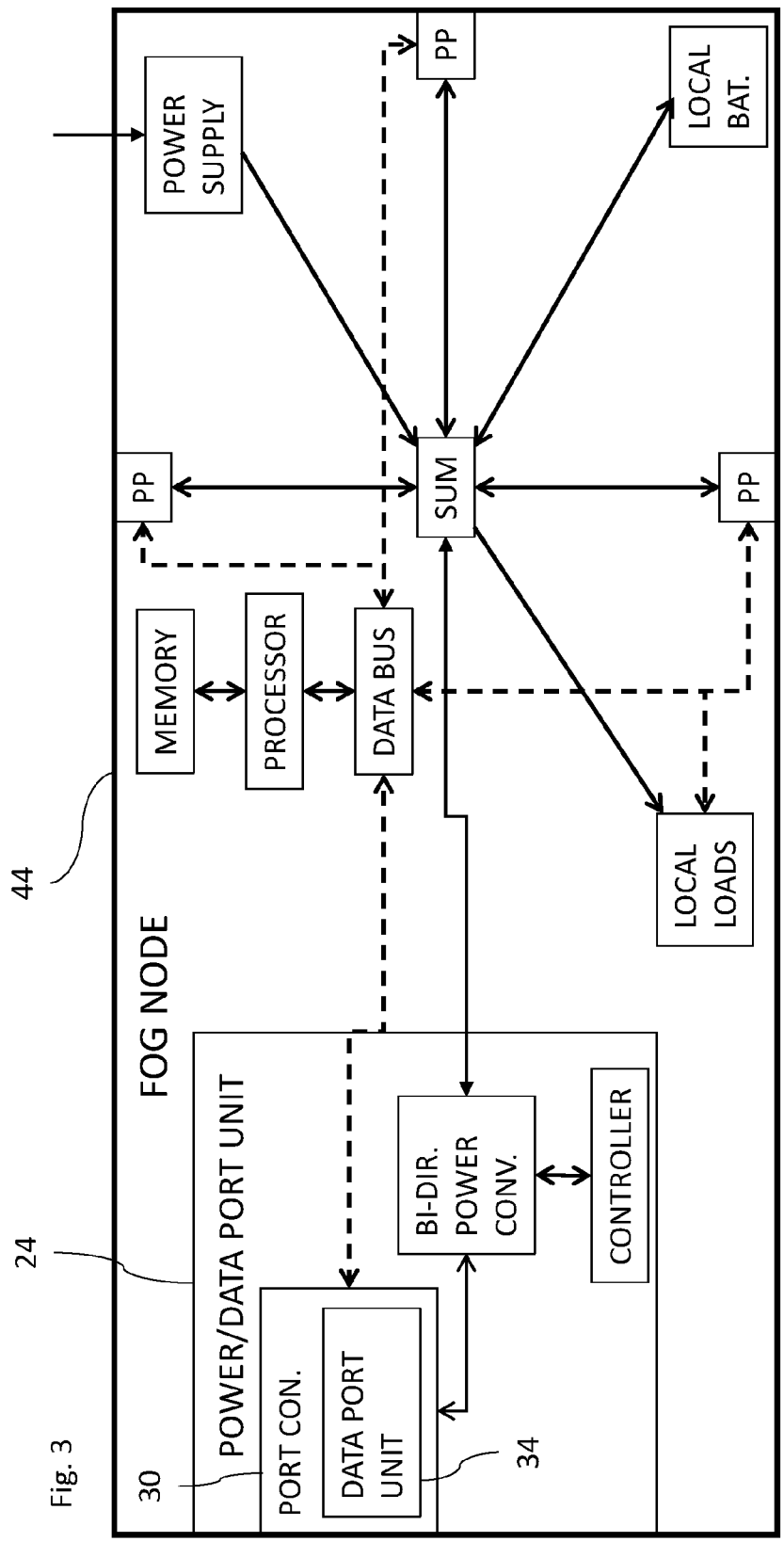
FIG. 3 is a block diagram view of an alternative network device for use in the system of FIG. 1.

Reference is now made to FIG. 3, which is a block diagram view of an alternative network device 44 for use in the system 10 of FIG. 1. The network device 44 is substantially the same as the network device 28 of FIG. 2 except that in the network device 44 the data port unit 34 is integrated within the port connector 30 of the power port unit 24 such that each power port unit 24 includes one data port unit 34. The port connector 30 may include center-tap transformers (not shown), as known in the art, that operate as port injectors to either: (i) combine data with power and then transmit the combined data and power in the downstream direction, or (ii) separate data from power when combined data and power are received in the upstream direction. Combined data and power may be carried over twisted pair conductors in a cable. Thus, power and data may be carried bi-directionally on the same pairs of pins/jacks on the port connector 30, and along the same pairs of twisted lines in cables.

Figure 4:
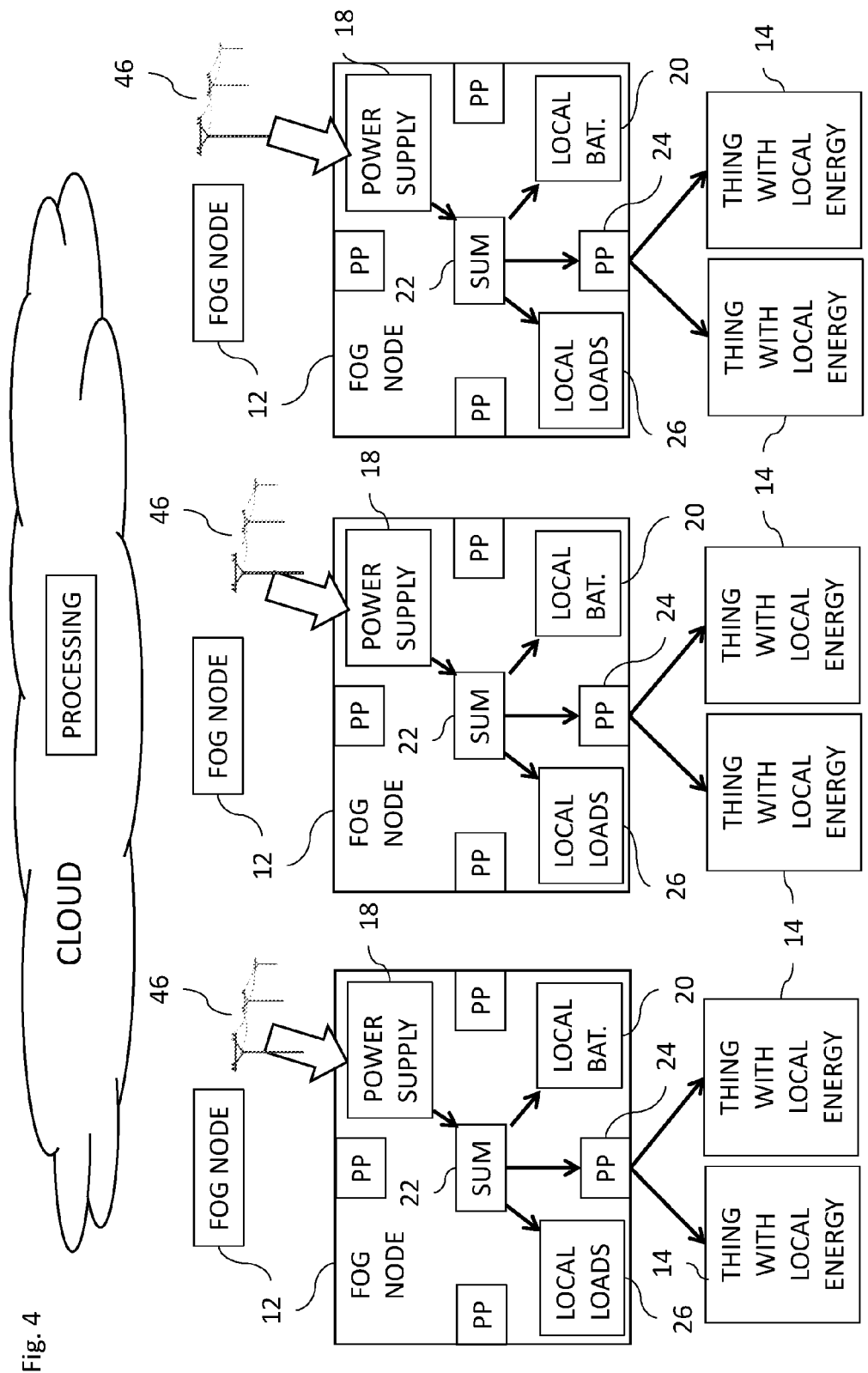
FIG. 4 is a partly pictorial, partly block diagram view of the network device power sharing system of FIG. 1 operating under a first mode of operation.

Reference is now made to FIG. 4, which is a partly pictorial, partly block diagram view of the network device power sharing system 10 of FIG. 1 operating under a first mode of operation, corresponding to a normal mode of operation. FIG. 4 shows power flowing from a utility grid 46, through the power supply 18 and summing node 22, and into the local loads 26, local battery 20 in each network device 12 and via one or more of the power port units 24 (only some labeled for the sake of simplicity) of each network device 12 to the IoT devices 14 connected to each network device 12. This power flow is shown by the arrows (both the thick and thin arrows) included in FIG. 4. It should be noted that two devices 14 are shown as being connected to each of the network devices 12 in the lower layer of the hierarchy of the devices 12 via a single power port unit 24 in the network device 12. In such a case, the power port unit 24 of each relevant network device 12 may include necessary connectors (two port connectors 30 (FIG. 3) and depending on the configuration of the power port unit 24, two data port units 34 (FIG. 2)) and necessary circuitry (two bi-directional power convertors 32 (FIG. 3)) to support connection to two devices 14. Alternatively, two devices 14 may be connected to one of the network devices 12 via two power port units 24 in the network device 12.

Figure 5:
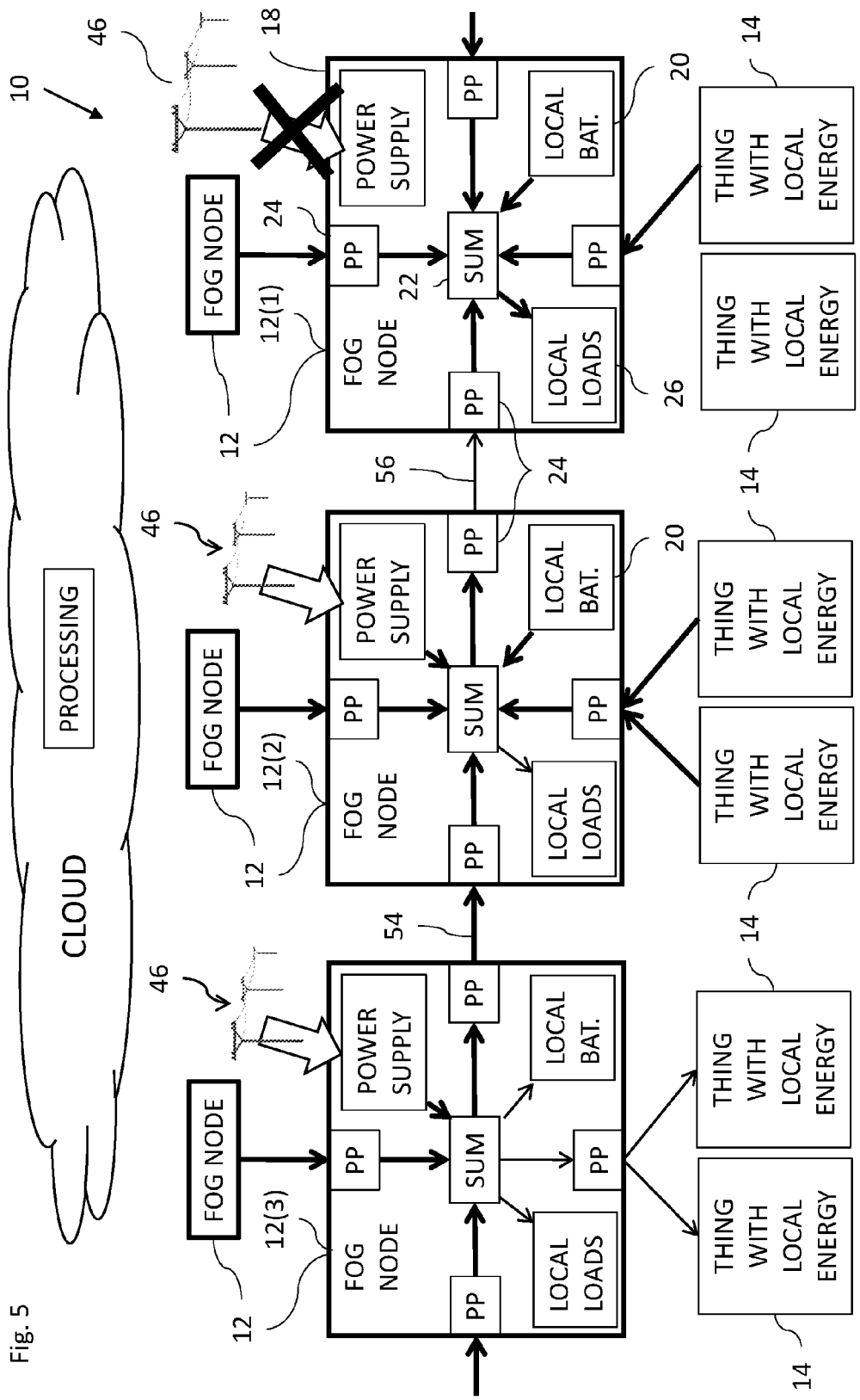
FIG. 5 is a partly pictorial, partly block diagram view of the network device power sharing system of FIG. 1 operating under a second mode of operation.

Reference is now made to FIG. 5, which is a partly pictorial, partly block diagram view of the network device power sharing system 10 of FIG. 1 operating under a second mode of operation. As depicted by the arrows in FIG. 5, if the utility grid 46 connection or power supply 18 fails for the network device 12(1), other network devices 12 may be automatically configured to supply redundant energy via the bidirectional power links between the network devices 12. So for example, in FIG. 5, a power link 54 between a network device 12(3) and the network device 12(2) is configured to pass power from the network device 12(3) to the network device 12(2). A power link 56 between the network device 12(2) and the network device 12(1) is configured to pass the power from the network device 12(2) to the network device 12(1). So excess electrical power may be transferred from the network device 12(3) and the network device 12(2) to the network device 12(1). Similarly, excess power may be transferred from other network devices 12 to the network device 12(1). Electrical power may also be transferred from connected devices 14 to the network device 12(1). The power received by the network device 12(1) is received by the summing node 22 of the network device 12(1) and transferred to the local loads 26 of the network device 12(1). The local battery 20 of the network device 12(1) may also be used to supply electrical power to the local loads 26 of the network device 12(1) via the summing node 22 of the network device 12(1). Similarly, some of the electrical power may be supplied from the local battery 20 and/or the connected devices 14 of one or more network devices 12, for example, the network device 12(2). Therefore, in response to a failure of the power supply, the processor 38 (FIG. 2) of the network device 12(1) is operative to poll at least two network devices 12 to determine if the network devices 12 are able to supply electrical power. The processor 38 of the network device 12(1) is operative to receive a response from each of the polled network devices 12. The response from the network devices 12 may be an acknowledgment that there is excess electrical power to transfer to the network device 12(1) and/or the response may include a command or a handshake protocol message for the network device 12(1) to configure the power port units 24 (only some labeled for the sake of simplicity) connected to the network devices 12 with excess power as PD port units. The processor 38 of the network device 12(1) is operative to configure the power port units 24 connected to the network devices 12 with excess power as PD port units to sink electrical power from the network devices 12 with excess power. The processor 38 of the network device 12(1) may be operative to instruct each of the network devices with the excess power to configure a power port unit connected to the network device 12(1) as a PSE port unit to provide electrical power to the network device 12(1) if the processor 38 did not receive the command or the handshake protocol message for the network device 12(1) to configure the power port units 24. At least some of the received electrical power is transferred from the power port units 24 that received the excess power via the power summing node 22 to one or more of the local loads 26.

Figure 6:
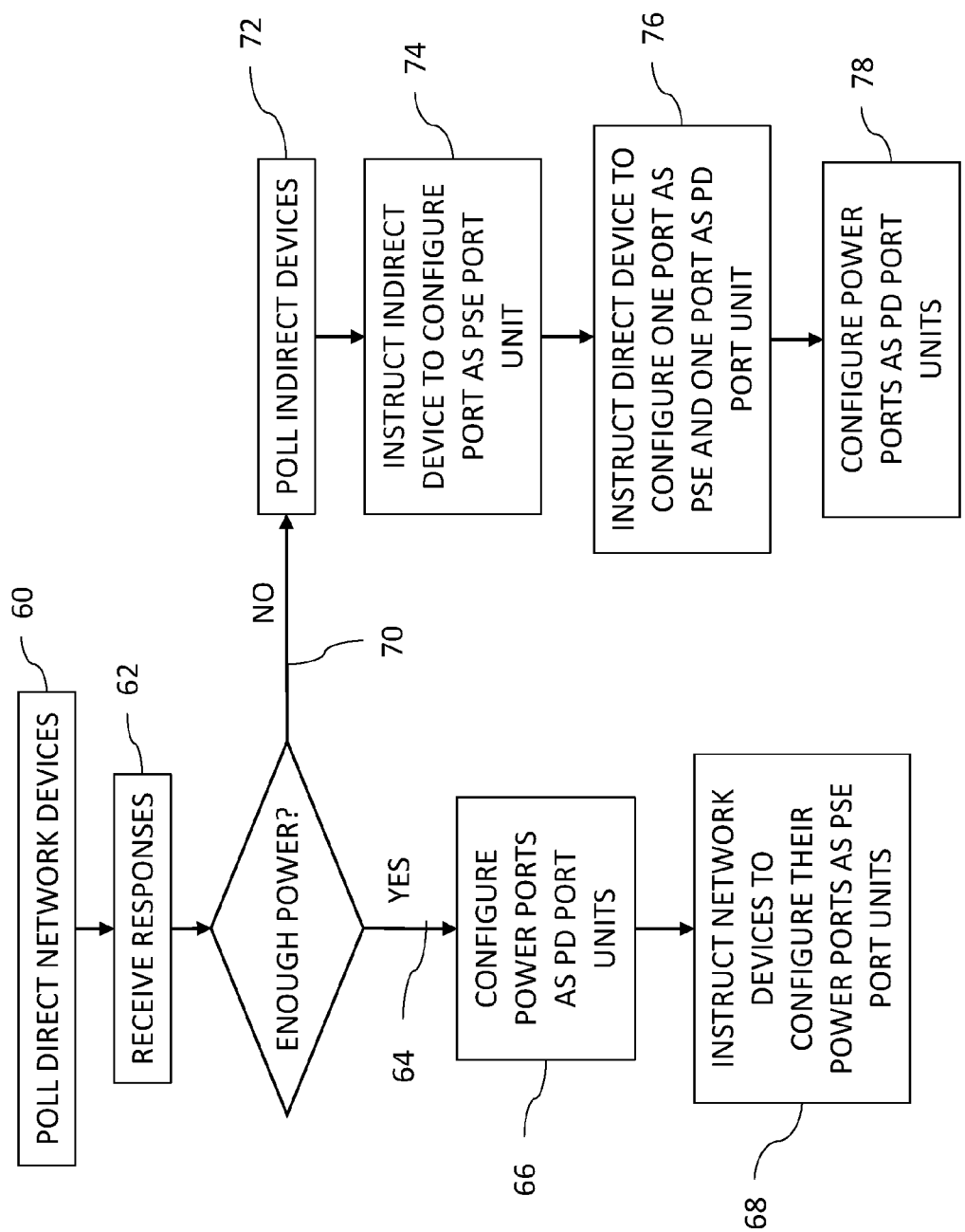
FIG. 6 is a flow chart showing exemplary steps performed by a network device which has a power supply power failure.

Reference is now made to FIG. 6, which is a flow chart showing exemplary steps performed by the network device 12(1) of FIG. 5 which has a power supply power failure. The steps described with reference to FIG. 6 describe the network device 12(1) first polling directly connected devices and then polling indirectly connected devices as will now be described in more detail. In response to the failure of the power supply, the processor 38 (FIG. 2) of the network device 12(1) is operative to poll a first group of network devices 12 (FIG. 5) (for example, including network device 12(2) of FIG. 5) directly connected to the network device 12(1) to determine if the first group of network devices 12 is able to supply electrical power (block 60). The processor 38 of the network device 12(1) is operative to receive responses from the first group of network devices 12 (block 62). If the first group is able to completely supply all the electrical power required by the network device 12(1) (branch 64), the processor 38 is then operative to configure the power port units 24 connected to the network devices 12 with excess power as PD port units to sink electrical power from the network devices 12 with excess power (block 66). The processor 38 of the network device 12(1) is operative to instruct each of the network devices 12 with the excess power to configure a power port unit connected to the network device 12(1) as a PSE port unit to provide electrical power to the network device 12(1) (block 68). If the first group is unable to completely, or unable to partially, supply all the electrical power required by the network device 12(1) (branch 70), the processor 38 is then operative to poll a second group of the plurality of network devices (for example, including network device 12(3) of FIG. 5) indirectly connected to the network device 12(1) to determine if the second group of network devices 12 is able to supply electrical power (block 72). The term "directly connected", as used in the specification and claims, is defined to include a device which is directly connected to another device without another device in between. The term "indirectly connected", as used in the specification and claims, is defined to include a device which is only connected to another device via an additional device or more devices in between. It is generally assumed that there will be some indirectly connected device or devices which have enough electrical power to share with the network device 12(1) unless there is a general power outage described in more detail below with reference to FIG. 8. The following description describes transferring power from the network device 12(3) of the second group, but it will be appreciated that power may be transferred from more than one network device 12 of the second group. The processor 38 of the network device 12(1) is operative to: instruct the network device 12(3) of the second group of network devices 12 to configure one of the power port units 24 (FIG. 5) of the network device 12(3) as a PSE port unit to provide electrical power to a network device 12 (e.g. the network device 12(2)) of the first group of network devices 12 (block 74); instruct the network device 12(2) to configure a first power port unit 24 of the network device 12(2) as a PD port unit to sink electrical power from the network device 12(3) and to configure a second power port unit 24 of the network device 12(2) as a PSE to provide electrical power to the network device 12(1) (block 76) thereby enabling the network device 12(2) to shuttle power from the network device 12(3) to the network device 12(1); and configure one of the power port units 24 of the network device 12(1) connected to the network device 12(2) as a PD port unit to sink electrical power from the network device 12(2) (block 78).

Figure 7:
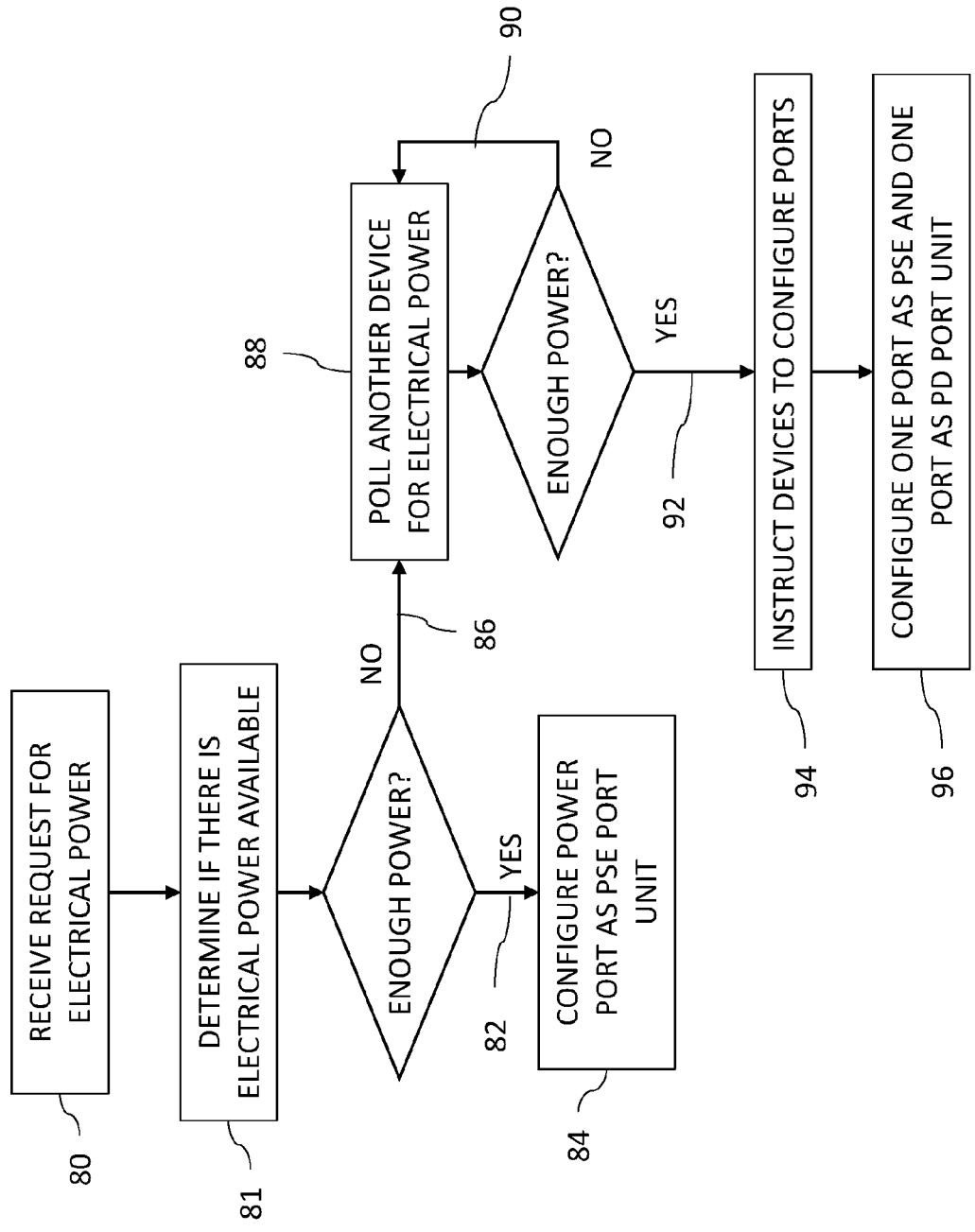
FIG. 7 is a flow chart showing exemplary steps performed by a network device receiving a request for electrical power.

Reference is now made to FIG. 7, which is a flow chart showing exemplary steps performed by the network device 12(2) of FIG. 5 receiving a request for electrical power. The protocol described with reference to FIG. 7 is different to the protocol described in FIG. 6 in that in FIG. 7 the directly connected device, the network device 12(2) receiving the electric power request, may in turn poll other devices on behalf of the requesting network device 12(1) (FIG. 5) and instruct the network devices 12 (FIG. 5) having excess power and the network device 12(1) to configure their power ports as necessary to transfer power to the network device 12(1). The protocol is now described in more detail. The processor 38 (FIG. 2) of the network device 12(2) is operative to: receive a request from the network device 12(1) to receive electrical power (block 80); and determine if there is electrical power available to transfer to the network device 12(1) (block 81). Sources of available power may be from a battery, excess capacity of the power supply 18 (FIG. 1), or from direct connected devices connected to device 12(2). If the network device 12(2) is able to supply all of the requested electrical power (branch 82), the processor 38 of the network device 12(2) is operative to configure one of the power port units 24 (FIG. 5) of the network device 12(2) connected to the network device 12(1) as a PSE port unit to supply electrical power to the network device 12(1) (block 84). In response to determining that the network device 12(2) is unable to completely, or unable to partially, supply all of the requested electrical power (branch 86), the processor 38 of the network device 12(2) is operative to poll the network device 12(3) (FIG. 5) to determine if the network device 12(3) is able to supply electrical power (block 88). If the network device 12(3) does not have enough power to transfer (branch 90), the network device 12(2) may poll another network device 12 (block 88). It should be noted that even if the network device 12(3) is unable to fulfill all of the power demand of the network device 12(1), the surplus power of the network device 12(3) may still be transferred to the network device 12(1) to partially fulfill the demand. Based on the network device 12(3) being able to supply the electrical power (branch 92), the processor 38 of the network device 12(2) is operative to: instruct the network device 12(3) to configure one power port unit 24 as a PSE port unit to provide electrical power to the network device 12(2); instruct the network device 12(1) to configure one power port unit 24 as a PD port unit to sink electrical power from the network device 12(2) (block 94); configure the power port unit 24 connected to the network device 12(3) as a PD port unit to sink electrical power from the network device 12(3); and configure the power port unit 24 connected to the network device 12(1) as a PSE port unit to provide electrical power to the network device 12(1) (block 96). In accordance with an alternative embodiment, instead of steps 94 and 96, the network device 12(2) may report back to the network device 12(1) that the network device 12(3) is able to supply power. In turn, the network device 12(1) is operative to instruct the network device 12(3) and the network device 12(2) to configure their power ports 24 accordingly to transfer the power from the network device 12(3) to the network device 12(1) via the network device 12(2). In particular, the processor 38 of the network device 12(2) may be operative to receive an instruction from the network device 12(1) to: configure the power port unit 24 connected to the network device 12(3) as a PD port unit to sink electrical power from the network device 12(3); and configure the power port unit 24 connected to the network device 12(1) as a PSE port unit to provide electrical power to the network device 12(1).

Reference is now made to FIG. 8, which is a flow chart showing exemplary steps performed by a network device during a non-localized power failure. In a scenario of a widespread power outage, perhaps impacting hundreds of network devices 12 (FIG. 5) in a region, the available power reserves of the network devices 12 and the devices 14 (FIG. 5) are collected. The minimum power consumption state (for example, to operate essential services) is gathered. Power is transferred from the network devices 12 with excess battery capacity to network devices 12 with critical need across the power links perhaps traversing a chain of many network devices to move power reserves from far away batteries. This transfer is continuously adjusted in direction and magnitude to try to maximize total run time for critical applications. As the network's batteries become nearly depleted, the local loads 26 (FIG. 5) of some network devices 12 may totally shut down, but the power port units 24 and summing nodes 22 stay operational to shuttle power across the network devices 12. Also, the inefficiency of the bi-directional power convertor 32 and cable energy losses in the potentially long inter-network device cables are taken into account by the optimization algorithm, by favoring power stores near the loads that the power stores run to maximize overall efficiency and reserve run time. The decision regarding power distribution may be made by one network device 12 and/or centrally by a cloud processing service. The decision regarding power distribution may include negotiation between two network devices 12 and may include an interaction between several network devices 12 in order to arrive at a decision. Alternatively, many individual network devices 12 may determine power distribution for neighboring network devices 12 (direct neighbors and indirect neighbors) on a periodic basis such that over a period of time power is distributed over the network. The network devices 12 performing the power distribution determination may be selected on a random basis (either self-selected or selected by a central management function).

Alternatively, negotiation may be performed between each network device 12 and its direct neighbors and power shared accordingly. The algorithm may be repeated periodically based on the current power available in each network device 12 (including power received from other network devices 12).

Power distribution determination by one of the network devices 12 or by the processor of a processing service in the cloud is now described in more detail. The processor 38 of one of the network devices 12 or the processor of a processing service in the cloud is operative to: poll a group of network devices 12 to determine a power supply level and power usage for at least one class of service (for example, but not limited to, essential or critical services) for each of the network devices 12 in the group (block 98); receive power supply level and usage data for each of the network devices 12 in the group (block 100); based on the received power supply level and usage data, prepare an electrical power sharing plan to share electrical power among the network devices 12 in the group and an electrical power usage plan as to how the electric power should be used by the network devices 12 in the group, for example, detailing which services should be operated by which network devices 12 (block 102); and instruct the network devices 12 in the group to share electrical power in accordance with the electrical power sharing plan and which services to operate in accordance with the electrical power usage plan (block 104) including instructing the network devices 12 in the group to configure their power port units 24 (FIG. 5) to share electrical power among the network devices of the group in accordance with the electrical power sharing plan. The group of network devices 12 may be limited to directly connected network devices 12. The group may also include indirect devices, possibly up to a certain number of hops away. The electrical power usage plan may be constructed based on a hierarchy of services giving priority to higher ranking, possibly more essential service, before lower ranking, possibly less essential services.

In practice, some or all of these functions may be combined in a single physical component or, alternatively, implemented using multiple physical components. These physical components may comprise hard-wired or programmable devices, or a combination of the two. In some embodiments, at least some of the functions of the processing circuitry may be carried out by a programmable processor under the control of suitable software. This software may be downloaded to a device in electronic form, over a network, for example. Alternatively or additionally, the software may be stored in tangible, non-transitory computer-readable storage media, such as optical, magnetic, or electronic memory.

It is appreciated that software components may, if desired, be implemented in ROM (read only memory) form. The software components may, generally, be implemented in hardware, if desired, using conventional techniques. It is further appreciated that the software components may be instantiated, for example: as a computer program product or on a tangible medium. In some cases, it may be possible to instantiate the software components as a signal interpretable by an appropriate computer, although such an instantiation may be excluded in certain embodiments of the present disclosure.

It will be appreciated that various features of the disclosure which are, for clarity, described in the contexts of separate embodiments may also be provided in combination in a single embodiment. Conversely, various features of the disclosure which are, for brevity, described in the context of a single embodiment may also be provided separately or in any suitable sub-combination.

It will be appreciated by persons skilled in the art that the present disclosure is not limited by what has been particularly shown and described hereinabove. Rather the scope of the disclosure is defined by the appended claims and equivalents thereof.

What is claimed is:

1. A data processing device comprising:
a plurality of power port units for connection to a plurality of network devices, each one power port unit of the plurality of power port units being selectively configurable to operate as either (i) a Power Source Equipment (PSE) port unit to provide electrical power to one network device of the plurality of network devices, or (ii) a Powered Device (PD) port unit to sink electrical power from the one network device;
a plurality of data port units to exchange data with the plurality of network devices;
a processor to process at least some of the data;
a power supply;
a plurality of local loads; and
a power summing node to electrically connect the power supply, the plurality of power port units and the plurality of local loads,
wherein in response to a failure of the power supply, the processor is operative to: poll at least two network devices of the plurality of network devices to determine if the at least two network devices are able to supply electrical power; receive a response from each of the at least two network devices; configure at least two power port units of the plurality of power port units as PD port units to sink electrical power from the at least two network devices, at least part of the received electrical power being transferred from the at least two power port units via the power summing node to one or more local loads of the plurality of local loads.

2. The device according to claim 1, wherein the processor is also operative to: instruct each of the at least two network devices to configure a power port unit as a PSE port unit to provide electrical power to the data processing device.

3. The device according to claim 1, wherein each one power port unit of the plurality of power port units additionally includes a power port unit controller to control the selectively configurable operation of the one power port unit as either a PSE port unit or a PD port unit.

4. The device according to claim 1, further comprising a rechargeable battery to: receive electrical power from a power source via the power summing node; and to supply electrical power to the local loads or to at least one network device of the plurality of network devices via the power summing node.

5. The device according to claim 1, wherein each of the plurality of power port units includes: a port connector to mate with a cable connecting the port connector with the one network device; a bi-directional power convertor to selectively convert electrical power in either a first direction and to provide converted electrical power to the port connector when the power port unit is configured to operate as the PSE port unit, or in a second direction to convert electrical power received from the port connector when the power port unit is configured to operate as the PD port unit.

6. The device according to claim 1, wherein in response to the failure of the power supply, the processor is operative to poll a first group of the plurality of network devices directly connected to the data processing device to determine if the first group of the plurality of network devices is able to supply electrical power; and if the first group is unable to supply all the electrical power, the processor is then operative to poll a second group of the plurality of network devices indirectly connected to the data processing device to determine if the second group of the plurality of network devices is able to supply electrical power.

7. The device according to claim 6, wherein the processor is operative to: instruct a first network device of the second group of the plurality of network devices to configure a power port unit as a PSE port unit to provide electrical power to a second network device of the first group of the plurality of network devices; instruct the second network device to configure a first power port unit as a PD port unit to sink electrical power from the first network device and to configure a second power port unit as a PSE to provide electrical power to the data processing device; and configure one of the plurality of power port units connected to the second network device as a PD port unit to sink electrical power from the second network device.

8. The device according to claim 1, wherein the processor is operative to: receive a request from a first network device of the plurality of network devices to receive electrical power; and determine if there is electrical power available to transfer to the first network device.

9. The device according to claim 8, wherein if the data processing device is able to supply electrical power, the processor is operative to configure a first power port unit of the plurality of power port units as a PSE port unit to supply electrical power to the first network device.

10. The device according to claim 8, wherein the processor is operative, in response to determining that the data processing device is unable to supply all the requested electrical power, to poll a second network device of the plurality of network devices to determine if the second network device is able to supply electrical power.

11. The device according to claim 10, wherein based on the second network device being able to supply electrical power, the processor is operative to: instruct the second network device to configure a power port unit as a PSE port unit to provide electrical power to the data processing device; configure one of the plurality of power port units connected to the second network device as a PD port unit to sink electrical power from the second network device; and configure another one of the plurality of power port units as a PSE port unit to provide electrical power to the first network device.

12. The device according to claim 11, wherein based on the second network device being able to supply electrical power, the processor is operative to instruct the first network device to configure a power port unit as a PD port unit to sink electrical power from the data processing device.

13. The device according to claim 8, wherein the processor is operative to receive an instruction from the first network device to configure one of the plurality of power port units connected to the first network device as a PSE port unit to provide electrical power to the first network device; and configure another one of the plurality of power port units as a PD port unit to sink electrical power from a second network device.

14. The device according to claim 1, wherein the processor is operative to: poll at least some network devices of the plurality of network devices to determine a power supply level and power usage for at least one class of service for each of the at least some network devices; receive power supply level and usage data for each of the at least some network devices; based on the received power supply level and usage data, prepare an electrical power sharing plan to share electrical power among the at least some network devices; and instruct the at least some network devices to share electrical power in accordance with the electrical power sharing plan.

15. The device according to claim 14, wherein the processor is operative to instruct the at least some network devices to configure a plurality of power port units to share electrical power among the at least some network devices in accordance with the electrical power sharing plan.

16. The device according to claim 14, wherein the processor is operative to: prepare an electrical power usage plan; and instruct the at least some network devices which services to operate in accordance with the electrical power usage plan.

17. The device according to claim 14, wherein the at least some network devices are network devices directly connected to the data processing device.

18. A method comprising:
 exchanging data with a plurality of network devices;
 processing at least some of the data;
 in response to a failure of a power supply, polling at least two network devices of the plurality of network devices to determine if the at least two network devices are able to supply electrical power;
 receiving a response from each of the at least two network devices;
 configuring at least two power port units as Powered Device (PD) port units to sink electrical power from the at least two network devices, each of the at least two power port units being selectively configurable to operate as either (i) a Power Source Equipment (PSE) port unit to provide electrical power to a network device, or (ii) a PD port unit to sink electrical power from a network device;
 receiving electrical power from the at least two network devices; and
 transferring at least part of the received electrical power via a power summing node to at least one local load.

19. A system comprising a device including a processor to:
 in response to a power supply failure in at least some network devices of a plurality of network devices, poll the at least some network devices to determine a power supply level and power usage for at least one class of service for each of the at least some network devices, the plurality of network devices being connected to each other to share data and electrical power;
 receive power supply level and usage data for each of the at least some network devices;
 based on the received power supply level and usage data, prepare an electrical power sharing plan to share electrical power among the at least some network devices and an electrical power usage plan for the at least some network devices; and
 instruct the at least some network devices to share electrical power in accordance with the electrical power sharing plan and which services to operate in accordance with the electrical power usage plan.

20. The system according to claim 19, further comprising the plurality of network devices, each of the plurality of network devices including:
 a plurality of power port units, each one power port unit of the plurality of power port units being selectively configurable to operate as either (i) a Power Source Equipment (PSE) port unit to provide electrical power to one network device of the plurality of network devices, or (ii) a Powered Device (PD) port unit to sink electrical power from the one network device;
 a power supply;
 a plurality of local loads; and
 a power summing node to electrically connect the power supply, the plurality of power port units and the local loads.

* * * * *